United States Patent [19]

Chadwick

[11] 4,330,012

[45] May 18, 1982

[54] VALVE FOR AERIAL SPRAYING

[76] Inventor: Russell D. Chadwick, 6125 SW. 152nd Ave., Beaverton, Oreg. 97140

[21] Appl. No.: 170,889

[22] Filed: Jul. 21, 1980

[51] Int. Cl.³ .............................................. F16K 11/07
[52] U.S. Cl. ................................ 137/625.48; 137/219; 137/563; 251/63; 251/340
[58] Field of Search ................................ 137/219–221, 137/563, 625.29, 625.33, 625.48; 251/63, 340

[56] References Cited

U.S. PATENT DOCUMENTS

| 1,477,722 | 12/1923 | Slattery | 137/219 X |
| 2,030,510 | 2/1936 | Griffiths | 251/340 X |
| 2,788,019 | 4/1957 | Mottram | 137/625.48 |
| 2,896,662 | 9/1956 | Thomas . | |
| 3,463,193 | 8/1969 | Yost . | |
| 3,774,638 | 11/1973 | Kriett . | |
| 3,911,957 | 10/1975 | McQueen . | |
| 3,951,170 | 4/1976 | Hill . | |

FOREIGN PATENT DOCUMENTS

| 553549 | 5/1923 | France | 137/219 |
| 2255523 | 7/1975 | France | 251/63 |

Primary Examiner—Robert G. Nilson

[57] ABSTRACT

A compact valve and actuator includes a housing with a cylindrical bore which is open on one end of the housing and substantially closed at the second end except for an inwardly extending coaxial inlet tube. A cylindrical slide member is concentrically received between the outside of the tube and the inside of the bore and is provided with a piston-forming flange which is restricted in axial movement by a stop ring also located around the slide member midway of the bore. The second end of the bore and the stop ring form ends of a cylinder for the aforementioned piston-forming flange of the slide member. The slide member further includes valving apertures which cooperate with the stop ring to communicate fluid received via the inlet tube either to the open end of the bore, or via apertures in the stop ring to a by-pass.

27 Claims, 4 Drawing Figures

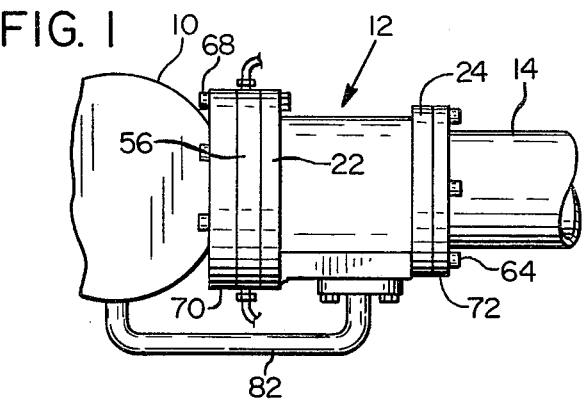
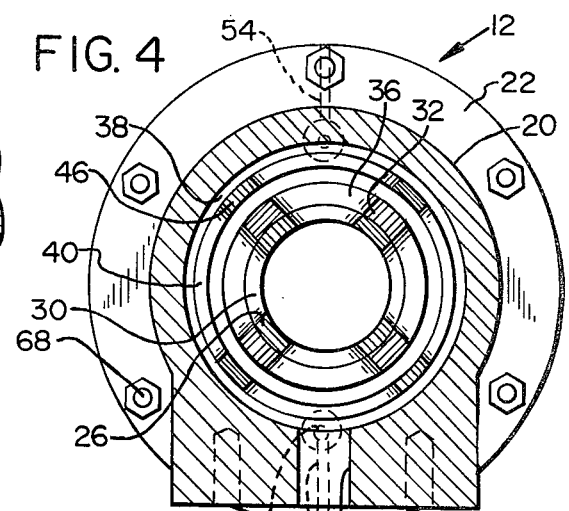
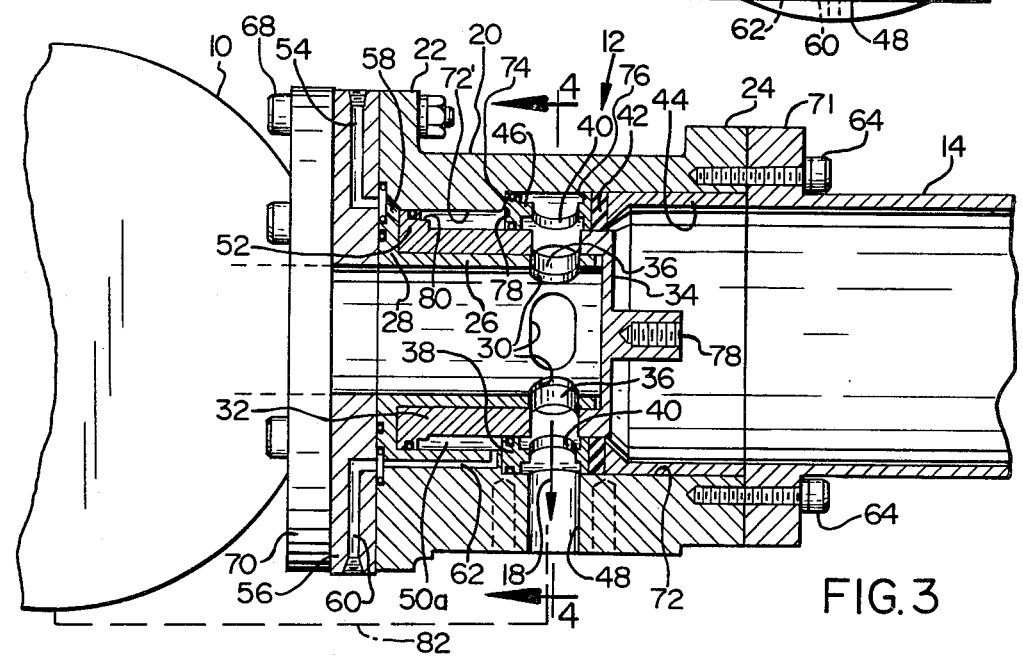
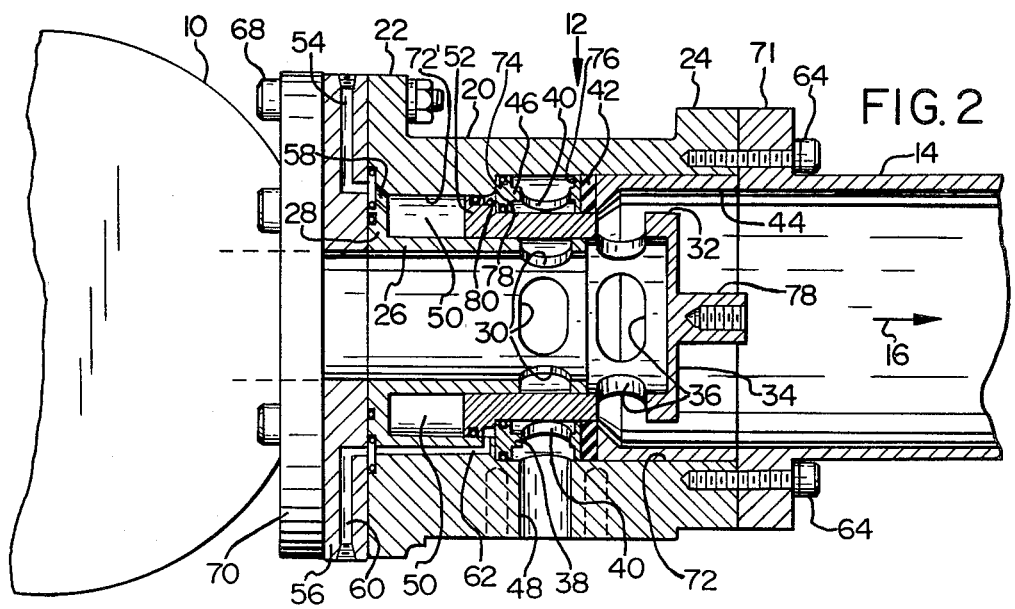

VALVE FOR AERIAL SPRAYING

BACKGROUND OF THE INVENTION

The present invention relates to a valve suitable for mounting in an aircraft for controlling fluids used in agricultural spraying, and particularly to such a valve which is compact and easily maintainable.

Light aircraft or helicoptors are frequently employed in spraying agricultural crops and the like, especially when large areas are to be treated, and of course this requires carrying pressurized spray equipment on the aircraft. In addition to a supply reservoir and pump, the equipment conventionally includes various valves, actuators for the valves, numbers of fluid connections, and a common control for appropriately initiating, concluding or directing the flow of spray fluid. Not only are systems of this type cumbersome and likely to cause maintenance problems, but also the components add weight and occupy space on the aircraft. While it is possible merely to combine various valving and connection elements of a conventional type into a unitary structure or block, such an assemblage would be relatively complicated and difficult to service.

SUMMARY OF THE INVENTION

In accordance with an embodiment of the present invention, a valve suitable for mounting in an aircraft to control fluids used in agricultural spraying comprises a substantially unitary housing provided with a bore defining a cavity having an open end and a substantially closed end except for a tubular member extending coaxially into the cavity for providing spray fluid or the like. A slide member is received coaxially between the bore of the cavity and the tubular member and forms an actuating means which is operated for opening and closing valving means formed by the slide member.

In a particular embodiment, a stop member is located along the cavity and forms one end of a cylinder for a piston actuating means. The stop member also cooperates with the slide member in directing spray fluid either out the open end of the bore in the case of one position of the slide member, or through a by-pass in the valve housing in the case of a second position of the slide member.

Also in accordance with a specific embodiment, a retainer is received within the bore for holding the said stop member in place, and the retainer is in turn positioned when an outlet pipe is secured to the housing.

This construction is light in weight and quite compact, employing a minimum of connections and moving parts rendering valve operation more reliable. The valve is economical and easily repaired, being simply assembled and disassembled by merely sliding the elements apart in an axial direction, the device also being constructed such that it is not sensitive to a particular circumferential alignment of parts. The valve is fast acting, having a valving mechanism characterized by rapid travel, and provides improved control over the spraying fluid.

It is accordingly an object of the present invention to provide an improved valve for agricultural spraying fluid which is compact, light in weight, and economical in construction.

It is another object of the present invention to provide an improved valve for agricultural spraying which is easily assembled and disassembled for cleaning and maintenance.

It is a further object of the present invention to provide an improved valve for agricultural spraying by aircraft which is rapid in operation and wherein moving parts are minimized.

It is another object of the present invention to provide an improved valve for agricultural spraying by aircraft which provides a substantially straight-through path with a minimum of a pressure drop for the spraying fluid.

It is another object of the present invention to provide an improved valve for agricultural spraying by aircraft which includes by-pass means for returning fluid to a reservoir.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view, partially broken away, of a valve according to the present invention together with attached components;

FIG. 2 is a longitudinal cross section, partially broken away, of such valve in an open position;

FIG. 3 is a longitudinal cross section, partially broken away, of such valve in closed or by-pass position; and FIG. 4 is a transverse cross section taken at 4—4 in FIG. 3.

DETAILED DESCRIPTION

Referring to the drawings, a reservoir and pump represented at 10 provide agricultural spray liquid or the like to a substantially unitary valve unit according to the present invention generally indicated at 12, and through the valve unit to exit pipe 14 attached to sprayers. The valve is shown in the open position in FIG. 2 so that the fluid flows out exit pipe 14 in the direction indicated by arrow 16, while in FIG. 3 the closed position of the valve is indicated wherein the fluid flows through by-pass port 48 and back to the reservoir via pipe 82.

The valve unit 12 according to the present invention includes a metal housing 20 of generally cylindrical construction having a rearward flange 22 joined to reservoir and pump 10 by way of coupling ring or disk 56, and a forward flange 24 connected to outlet pipe 14. Bolts 68 join flange 22 to disk 56 and pump flange 70, while screws 64 are employed to attach flange 71 of the outlet pipe to forward flange 24 on the valve, with a suitable sealant being employed between flanges 24 and 71.

The housing 20 is provided with a cylindrical bore 72 defining a cavity open toward outlet pipe 14, being slightly larger in diameter than the outlet pipe where the two units join. The cavity is substantially closed at its rearward end 28 except for an inwardly extending concentric metal tube 26 of smaller diameter than the bore and forming an integrally welded part of the housing, being joined thereto by end web 28. Tube 26, which is cylindrical and open on both ends, is somewhat shorter than the overall cavity provided by bore 72, and is supplied with agricultural spray fluid at its rearward end from reservoir end pump 10. Tube 26 is also formed with a plurality of peripheral side apertures 30 toward the outlet end thereof which extend circumferentially around the tube and are oblong having curved ends, being longer in the circumferential direction than the spacing therebetween for reasons which will hereinafter become more evident.

Concentrically positioned around tube 26 is a metal cylindrical slide member 32 having a closed forward end 34 and a plurality of peripheral side apertures 36 near end 34 which extend circumferentially around the slide member. These apertures are also oblong with curved ends and wider in the circumferential direction than the spacing therebetween. The slide member 32 is matingly received in slidable relation over tube 26 and has a radial flange 52 at the first end thereof closest to the inlet of the valve which sealingly engages the inside of the bore at 72' where the inner bore of the housing is somewhat reduced in diameter. The exterior periphery of flange 52 is provided with an O-ring seal. The slide member at its closed end is formed with an axial puller boss 78 which is internally threaded to receive a tool or the like for removing the slide member.

A metal cylindrical stop ring 38 is slidably received as an insert within bore 72 and over slide member 32, the rim of the stop ring being H-shaped having a forward side 76, a rearward side 74, and a narrower axial central web 46 provided with apertures 40 extending circumferentially therearound which are elongated with curved ends and having a greater circumferential dimension than the spacing therebetween. Side 74 is provided with O-ring seals engaging the interior of bore 72 and the exterior of slide member 32. The slide member is received within bore 72 up against a step or shoulder 78 where the bore reduces slightly in diameter to the bore diameter indicated at 72' and is positioned thereby about midway along the cavity. The stop ring is held in place with a plastic spacer and sealing member 42 engaged by the end of a cylindrical retainer 44 fitted into the outlet end of the bore. The retainer is in turn secured in place when screws 64 fasten down outlet pipe 14 thereagainst, but is readily removable when the outlet pipe is removed. The stop ring 38 limits the axial movement of the slide member between a position where spraying fluid is communicated to pipe 14, and a position where spraying fluid is communicated to port 48.

The central web 46 of the stop ring is spaced both from the exterior of the slide member 32 and the interior of bore 72 so as to form interior and exterior fluid passages therearound which communicate through apertures 40. In alignment with the exterior fluid passage is a port 48 in the side of housing 20 forming a by-pass for fluid pressure and is suitably connected back to the reservoir and pump 10 via pipe 82, e.g. for the purpose of maintaining movement of the spraying fluid to keep desired substances in suspension.

A piston chamber or cylinder is provided between the outside of tube 26 forming an inside cylinder wall and the inside of bore 72' forming an outside cylinder wall, and between cavity end 28 and end 74 of stop ring 28. Within this cylinder, flange 52 of slide member 32 forms a piston which is urged back and forth by hydraulic fluid or the like admitted to the cylinder. A control fluid or hydraulic fluid may be admitted to chamber or cylinder 50 by way of passage 54 in coupling disk 56 and by way of connecting passage 58 in web 28. Upon admission of such fluid into chamber 50, the slide member 32 is urged to the right as shown in FIG. 2, for providing the straight-through exit of agricultural spraying fluid via apertures 36 in slide member 32 to exit pipe 14 as the apertures 36 are positioned beyond the end of tubular member 26. A second passage 60 in coupling disk 56 leads to passage 62 in housing 20 which communicates with the piston chamber on the opposite side of flange 52, with the end flange being cut away from bore 72' and end 74 of the stop ring to form a circumferential groove or shoulder 80. As the hydraulic fluid is admitted through passage 62 and above shoulder 80, the slide member 32 is urged to the left as illustrated in FIG. 3, filling chamber 50a. Consequently the valve is closed and the agricultural spraying fluid is by-passed through apertures 30, apertures 36, and apertures 40 in stop ring 38, all being in longitudinal alignment for this position of the slide member, and to port 48, as indicated by arrow 18 in FIG. 3, such port leading back to the reservoir. Although a coupling disk 56 provided with passages 54 and 60 is illustrated, these passages could be incorporated in flange 70 if so desired, in which case disk 56 would be eliminated.

The various coaxial cylindrical components of the valve according to the present invention do not have to be circumferentially aligned or keyed in angular relation with respect to one another, but are easily assembled and disassembled without regard to alignment of apertures or the like. Since apertures 30 and 36 are substantially wider in a circumferential direction than the spacing therebetween, even complete misregistry between the apertures will afford an adequate fluid passage, for example when the valve is in the closed position as illustrated in FIG. 3. Also, the circumferential passages on the inside and outside of web 46 of stop ring 38 facilitate the flow of fluid between apertures 36 in the slide member and port 48 which is disposed at only one circumferential location.

The valve according to the present invention has the advantage of being very compact with only one moving part, slide member 32, and is fast acting in operation. However, it is easily assembled and disassembled from the outlet end thereof merely by loosening screws 64 for removal of outlet pipe 14. Retainer 44 is then removed followed by spacer and sealing member 42. Then stop ring 38 can be slidably removed as well as slide member 32. Of course, the whole assembly can be slid out at one time by engaging the end of slide member 32 by means of boss 78. Assembly is just as simply accomplished, with the parts being held together by the connection to the outlet pipe.

In operation, agricultural spraying fluid is supplied through tube 26 which provides the inlet passage for agricultural spraying fluid. With hydraulic fluid under pressure applied through passage 54 into chamber 50, the slide member 32 will be forced to the right as indicated in FIG. 2 with flange 52 of the slide member acting as a piston. Then the agricultural spraying fluid will flow directly through and out the end of tube 26, and through apertures 36 in the slide member whereby a substantially straight-through passage of fluid is afforded with a minimum interference in fluid flow. For closing the valve, hydraulic fluid under pressure is admitted through passage 60, forcing the slide member 32 to the left as illustrated in FIG. 3 such that the spraying fluid is by-passed as indicated at 18. The slide member 32 thus provides the principal valving means for providing selective communication between tube 26 and the bore or cavity, particularly as the slide member cooperates with stop ring 38. Although by-pass of fluid pressure is employed in accordance with the preferred embodiment of the present invention, it will be readily appreciated that the various apertures 30, 40 and 48 can be eliminated, if so desired, whereby the valve becomes an on-off valve. Alternatively, a by-pass may be left open for dumping spraying fluid in appropriate cases, or may be led to a receptacle other than the supply reservoir. Also, hydraulic fluid need not be employed as the control medium, but rather the piston flange 52 may be pneumatically operated by admitting air under pressure through passages 54 and 60 respectively.

While particular reference is made to aircraft application of the valve according to the present invention, especially because of its lightweight, compact structure and fast action, the present invention is also applicable to other systems requiring remote valving. Materials for manufacturing the valve according to the present invention are not limited to metal, but rather many synthetic and/or natural materials are suitable for the valve's construction.

The valve is described as mounted between the flange of a reservoir and pump on the one hand, and the flange of an outlet pipe on the other, However, either or both of these connections may be threaded or tubular or may employ a hose fitting or the like.

While I have shown and described preferred embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A valve suitable for mounting in an aircraft for controlling fluids for agricultural spraying, said valve comprising:
    a housing provided with a bore defining a cavity having a substantially closed end except for a tubular member extending coaxially into said cavity from said end for providing a fluid flow passage,
    and a slide member having a first end received coaxially between said bore and said tubular member forming an actuating means toward said substantially closed end of said cavity, said slide member being closed on its second end and having side openings to form valving means with said tubular member for providing selective communication of fluid between said tubular member and said bore in accordance with the axial position of said slide member.

2. The valve according to claim 1 wherein the first end of said slide member toward the substantially closed end of said cavity comprises a radial flange to provide said actuating means as an actuating piston, and including means for providing a control fluid opening between said piston and the substantially closed end of said cavity around said tubular member.

3. The valve according to claim 2 further including means for providing a control fluid opening on the remote side of said piston from the substantially closed end of said cavity.

4. The valve according to claim 3 further including a stop member positioned in said bore on the remote side of said piston from the substantially closed end of said cavity for determining a remaining wall of a cylinder cooperating with said piston.

5. The valve according to claim 4 wherein said stop member cooperates with said slide member in forming said valving means selectively to close off the flow of fluid between the tubular member and the bore in accordance with the axial position of said slide member.

6. The valve according to claim 4 wherein said cavity has an open end opposite said closed end, said cavity being cylindrical and said slide member being cylindrical and removably insertable into said housing between said bore and said tubular member through said open end of said cavity, said stop member being cylindrical and also being removably insertable into said housing between said bore and said tubular member through said open end of said cavity.

7. The valve according to claim 1 wherein said cavity is cylindrical and said slide member is cylindrical and slidable between said bore and said tubular member.

8. The valve according to claim 1 wherein said cavity has an open end opposite said closed end, said cavity being cylindrical and said slide member being cylindrical and removably insertable into said housing between said bore and said tubular member through said open end of said cavity.

9. A valve suitable for mounting in an aircraft for controlling fluids for agricultural spraying, said valve comprising:
    a stationary tubular member for receiving fluid,
    a slide member having a first end axially slidable with respect to said tubular member and having a closed second end, said slide member in a given axial position providing an outlet for said fluid,
    and a housing for said valve having a bore for receiving said slide member and forming an actuating cylinder for moving said slide member as a piston to change the axial position of said slide member with respect to said tubular member to and from said given position.

10. The valve according to claim 9 further including means disposed along said slide member for limiting the axial movement thereof.

11. The valve according to claim 9 wherein said tubular member, said slide member and said bore are coaxial.

12. The valve according to claim 11 wherein said slide member is received over said tubular member, the outside wall of said tubular member forming the inside wall of said cylinder with said bore forming the outside wall of said cylinder, and wherein the first end of said slide member extends therebetween in slidably sealing relation.

13. A valve suitable for mounting in an aircraft for controlling fluids for agricultural spraying, said valve comprising:
    a housing provided with a cylindrical bore defining a cavity having a first open end and a second end opposite said first end,
    a tubular member coaxial with said bore, said tubular member being smaller in diameter than said bore and extending into said cavity from said second end, the second end of said cavity being closed around said tubular member but open into said tubular member to provide a fluid passage,
    a cylindrical slide member having a first end received coaxially between the cavity inner wall and said tubular member and being slidable with respect thereto to provide an actuating piston, said slide member being closed on its second end for selectively blocking the flow of fluid from said tubular member in a first axial position while having side openings proximate its second closed end for selectively providing a passage for flow of fluid to said cavity and said first open end in a given axial position of said slide member, and stop means for limiting travel of said slide member along said tubular member between said first position and said given position wherein said side openings communicate into said cavity.

14. The valve according to claim 13 wherein said stop means comprises a cylindrical insert slidably received in said bore between said slide member and the inside of said bore in spaced relation from the second end of said cavity.

15. The valve according to claim 14 wherein said stop means is positioned along said slide member for closing off said side openings of said slide member from said cavity in said first position.

16. The valve according to claim 15 wherein said stop means is provided with openings adjacent the openings in said slide member in the first position thereof, and said housing has an opening adjacent the openings in said stop means to provide by-pass of fluid from said tubular member.

17. The valve according to claim 16 wherein the openings in said stop means extend circumferentially around said stop means.

18. The valve according to claim 17 wherein said stop means has a rim which is substantially H-shaped in cross section having radial sides in bearing relation to said bore and said slide member, and having a narrower central web extending axially between said sides and where said openings are located, to provide fluid passages between said web and said bore, and between said web and said slide member.

19. The valve according to claim 18 wherein the first end of said slide member is provided with an outwardly extending radial flange to provide said actuating piston, the second end of said cavity forming one end of a cooperating cylinder in which said piston slides and a side of said stop means forms a remaining end of the cylinder in which said piston slides.

20. The valve according to claim 19 wherein said housing is provided with control fluid passages into said cooperating cylinder on each side of said outwardly extending radial flange of said slide member.

21. The valve according to claim 19 wherein said bore has a larger diameter toward said first open end than toward said second end forming a shoulder therebetween, said stop means being received against said shoulder, and a retainer received within said bore from said first open end to hold said stop means in place.

22. The valve according to claim 21 further including an outlet pipe releasably secured to said housing at the open end of said bore and being smaller in diameter than said bore for holding said retainer in place.

23. The valve according to claim 15 wherein the end of said tubular member is open toward said first open end of said cavity, and the openings in said slide member extend beyond the open end of said tubular member in said given axial position.

24. The valve according to claim 23 wherein said openings in said slide member and tubular member extend circumferentially around said members, there being greater circumferential distance across said openings than therebetween.

25. The valve according to claim 15 wherein said tubular member is provided with openings adjacent the openings in said slide member in the first position thereof, said stop means is provided with openings adjacent the openings in said slide member in the first position thereof, and said housing has an opening adjacent the openings in said stop means to provide by-pass of fluid from said tubular member.

26. A valve suitable for mounting in an aircraft for controlling fluids for agricultural spraying, said valve comprising:

a stationary tubular member for receiving fluid, a tubular slide member coaxially slidable over said tubular member, said slide member in a given axial position providing an outlet for said fluid, a housing for said valve having a bore coaxial with said slide member and tubular member for receiving said slide member between said bore and said tubular member, said housing having a by-pass port for communicating with said tubular member via said slide member in a second axial position of said slide member, and means for actuating said slide member between the first and second positions.

27. A valve suitable for mounting in an aircraft for controlling fluids for agricultural spraying, said valve comprising:

a housing provided with a bore defining a cavity having a first end provided with a tubular member extending coaxially into said cavity from said first end for providing a fluid flow passage, and a cylindrical slide member having an open first end received coaxially between said bore and said tubular member forming an actuating means toward said first end and forming valving means for providing selective communication of fluid between said tubular member and said bore in accordance with the axial position of said slide member, said slide member being closed on its second end farthest from the first end of said cavity, for blocking the flow of fluid axially from said slide member.

* * * * *